(12) United States Patent
Maurer

(10) Patent No.: US 7,030,341 B2
(45) Date of Patent: Apr. 18, 2006

(54) COOKING VESSEL

(76) Inventor: Ulrich Maurer, Alte Winterthurerstrasse 78, CH-8304 Wallisellen (CH)

( * ) Notice: Subject to any disclaimer, the term of this patent is extended or adjusted under 35 U.S.C. 154(b) by 0 days.

(21) Appl. No.: 11/085,661

(22) Filed: Mar. 21, 2005

(65) Prior Publication Data

US 2005/0204930 A1    Sep. 22, 2005

(30) Foreign Application Priority Data

Mar. 22, 2004  (CH)  .................................. 0477/04

(51) Int. Cl.
*F27D 11/00*  (2006.01)

(52) U.S. Cl. ..................... 219/430; 99/403; 126/377.1; 126/376.1; 126/378.1

(58) Field of Classification Search ................ None
See application file for complete search history.

(56) References Cited

U.S. PATENT DOCUMENTS

| 2,678,039 | A | * | 5/1954 | Keating | .................... 126/391.1 |
| 3,263,596 | A | * | 8/1966 | Thomas | ....................... 99/408 |
| 4,550,711 | A | * | 11/1985 | Griffiths | .................... 126/391.1 |

\* cited by examiner

*Primary Examiner*—Joseph Pelham
(74) *Attorney, Agent, or Firm*—Bachman & LaPointe, P.C.

(57) ABSTRACT

A frying vessel having heating elements placed within a cylindrical sleeve so as to direct a current of heated frying fat.

11 Claims, 5 Drawing Sheets

COOKING VESSEL

BACKGROUND OF THE INVENTION

The invention relates to a cooking vessel with a frying fat heating device for a deep frying appliance for the 'floating' frying of food portions and luxury foodstuffs.

By 'floating frying' is meant the preparation of food or other luxury items (in the following referred to simply as 'food'), characterised in that the food is cooked in hot deep fat, ie. appropriately cooked through for consumption. For this type of food preparation, the term 'deep frying', and for equipment for deep frying the term 'deep fat frier', have become accepted, and these are used in the presentation of the invention. Deep fat friers are used in particular for the preparation of bulk items which are prepared in the form of equally sized strips.

A bulk item of the type described, often intended for consumption, is potatoes which are prepared for consumption by deep frying. Such bulk items are generally known under the term 'chip portions'.

Equipment for the production of chip portions is established which produces the latter from a raw or pre-cooked bulk material, manually or automatically. The established automatic equipment here essentially comprises a storage container for uncooked chips and a cooking vessel (in the following also referred to as a deep frying drum), whereby the storage container is connected to the deep frying drum by means of a pipe connection.

A scooping device operating in the storage container forms a pile of the pre-determined quantity and feeds this into the pipe which conveys the bulk into the deep frying drum. In the deep frying drum, the bulk is cooked through in hot oil, and then carried out of the deep frying drum.

A turning element turns in the deep frying drum containing the liquid frying fat, and said turning element comprises radially projecting rakes around its circumference, positioned at equal distances around said circumference, which convey the bulk material through the hot frying fat for cooking and then carry it out of the appliance. In so doing, the frying fat becomes stale, and so must be changed periodically. It is changed by means of a discharge cock which carries the stale frying fat out of the deep frying drum, whereby the deep frying drum is then filled back up again on its front side. The appliance must be cleaned before refilling, and this takes a lot of time and effort in order to keep the equipment in a hygienically sound state. It is the frequency of the time and effort taken to do this as well as the cost of the frying fat to be changed which determines the cost-effectiveness of a deep frying appliance.

The frequency of the changes of frying fat depends greatly upon the type of heating, ie. heating up, and the homogeneity of the heat distribution in the frying fat. Deep frying drums are known with direct and with indirect frying fat heating. Direct frying fat heating means that the heating is by means of heating elements located in the frying fat (heating within the deep frying drum), and indirect heating means that the frying fat is heated by means of a cyclical heating device outside of the deep frying drum (heating outside of the deep frying drum). Heating in a vessel by warming the vessel walls by means of heat sources which act upon the outer surface of the vessel walls also falls into the category of indirect heating.

With the first case of indirect heating, the frying fat or deep frying oil is pumped out of the drum, conveyed through the cyclical heating device, and subsequently pumped back into the drum. There are disadvantages associated with these types of heating. The direct heating brings about convection in the liquid frying fat, ie. so-called equalisation currents intended to distribute heat evenly through the frying fat. If a portion of material to be cooked is introduced into the frying fat, the convection and heat distribution is easily disrupted, and the items to be cooked are not cooked through sufficiently. These problems relating to convection also occur with indirect heating in a container by means of heat sources which act upon the vessel from outside. In order to counter these, heating temperatures for the frying fat are set higher than actually required, ie. at an inflated level. It is this inflated heating output which contributes significantly to the deterioration of the frying fat, and so also to increased frequency of the changes. With the indirect heating method by means of a so-called cyclical heating device, the method used is a circulation process.

Because a pump sucks frying fat out of a cooking drum or a cooking vessel, feeds it through the heating device and conveys it back into the cooking drum, the circulating quantity of frying fat brings about a certain current in the frying fat which gives rise to problems of convection in the background. In the pumps, on the other hand, the liquid frying fats are subjected to mechanical forces which lead to premature deterioration, and so also to frequent changes of the frying fat.

SUMMARY OF THE INVENTION

The object of this invention is to provide a cooking vessel with heating, with which the disadvantages of the established cooking vessels can be avoided, and this problem is solved by the cooking vessel of the present invention wherein the frying fat heating device has a hollow cylindrical conduction sleeve with heating elements accommodated within the conduction sleeve and a current space connected with the conduction sleeve via a floor space.

BRIEF DESCRIPTION OF THE DRAWINGS

Further advantages, features and details of the invention can be found in the following description of a preferred embodiment and the drawings.

DETAILED DESCRIPTION

Figure 1:
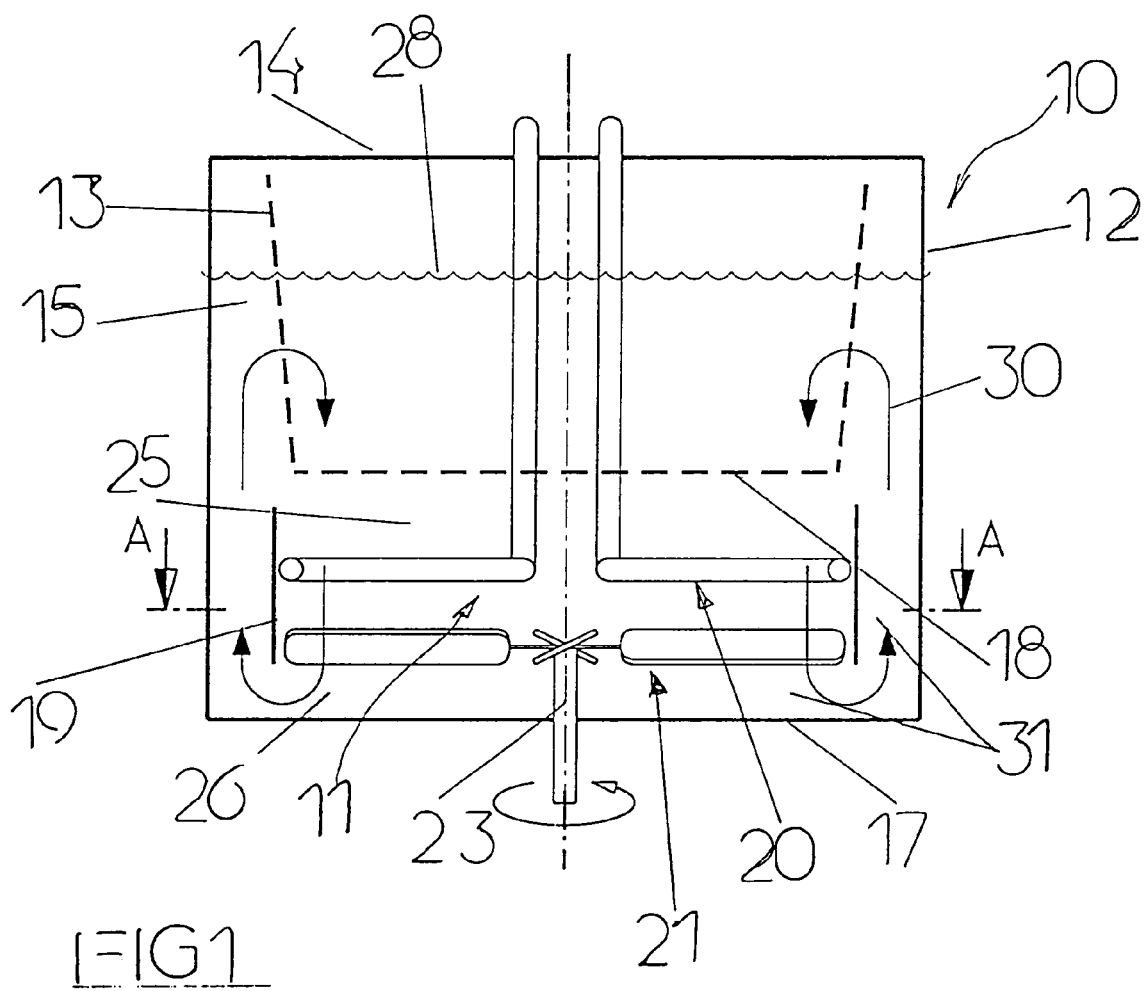
FIG. 1 shows a frying fat heating device in a cooking vessel in a side view and in a section.
Figure 4:
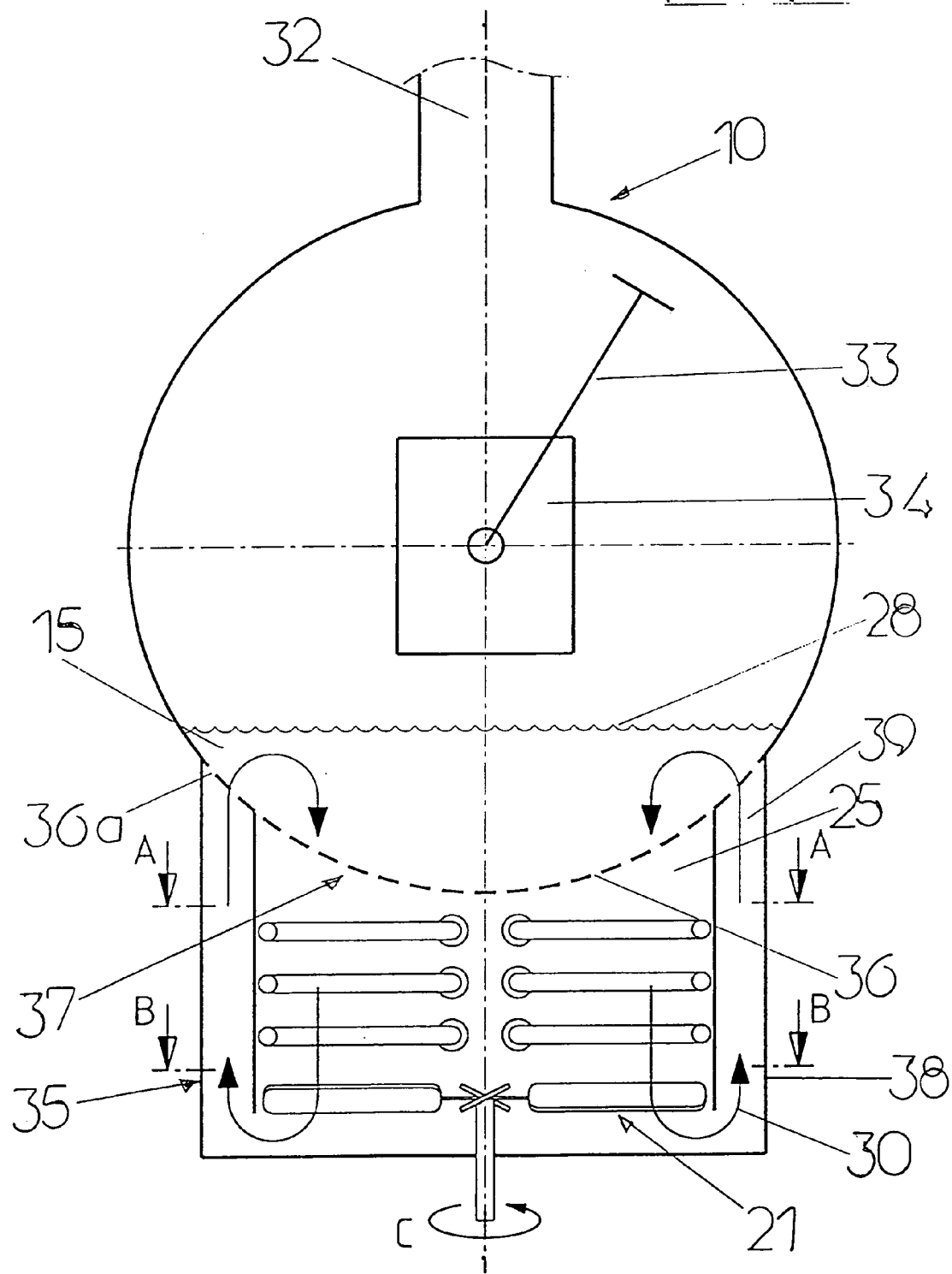
FIG. 4 shows a frying fat heating device combined with a cooking vessel in a front view and in a section.

FIG. 1 and FIG. 4 show the cooking vessel 10 with a frying fat heating device 11 of the design in accordance with the invention (in the following referred to as heating device 11 for short). The term cooking vessel should be understood as meaning any container which, for the cooking of portions of food, eg. portions of chips (in the following referred to as items to be cooked), contains frying fat 15, eg. frying oil, whereby changeable heat contents can be set for the frying fat 15, and that comprises devices for introducing and removing the items to be cooked into and from the container, ie. the frying fat. The cooking vessel 10 in accordance with FIG. 1 comprises, as a container, a pot 12, in which the heating device 11 and a receptacle 13 for introducing and removing the items to be cooked into or from the frying fat are accommodated. The receptacle 13 is preferably a basket made from wire, through the wall sections of which the liquid frying fat can flow, and which is hung loose on the upper open end 14 of the receptacle 13 so that it can be introduced into and removed from the frying fat.

Figure 5:
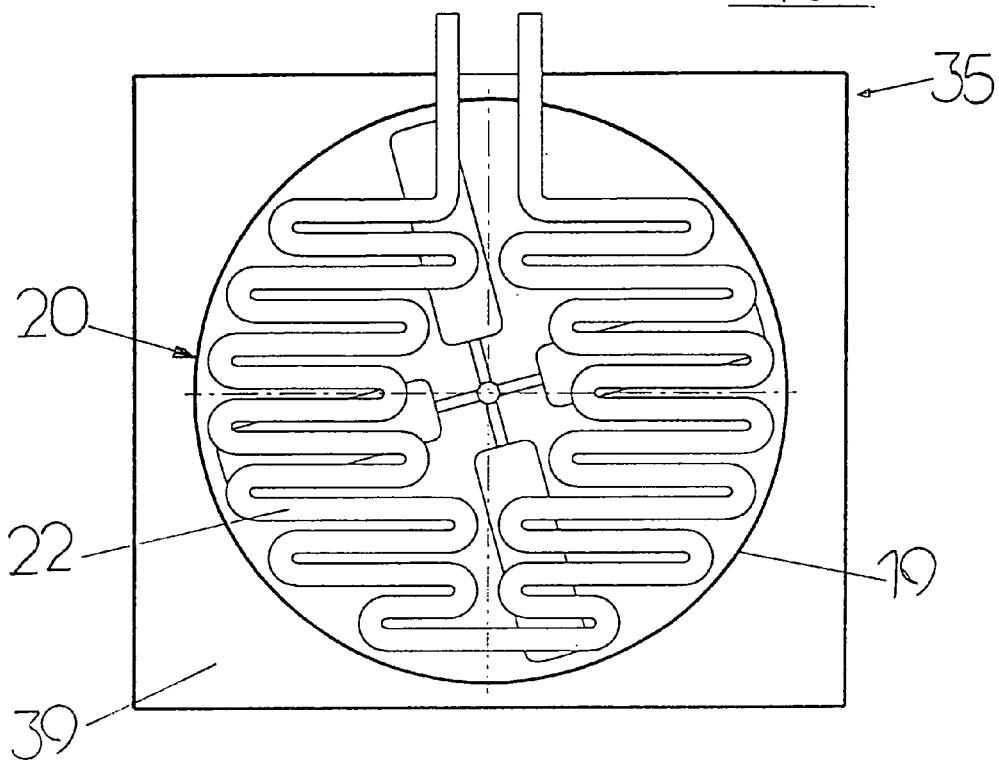
FIG. 5 shows an overhead view onto the frying fat heating device in accordance with FIG. 4 along the intersection line A—A in FIG. 4.
Figure 6:
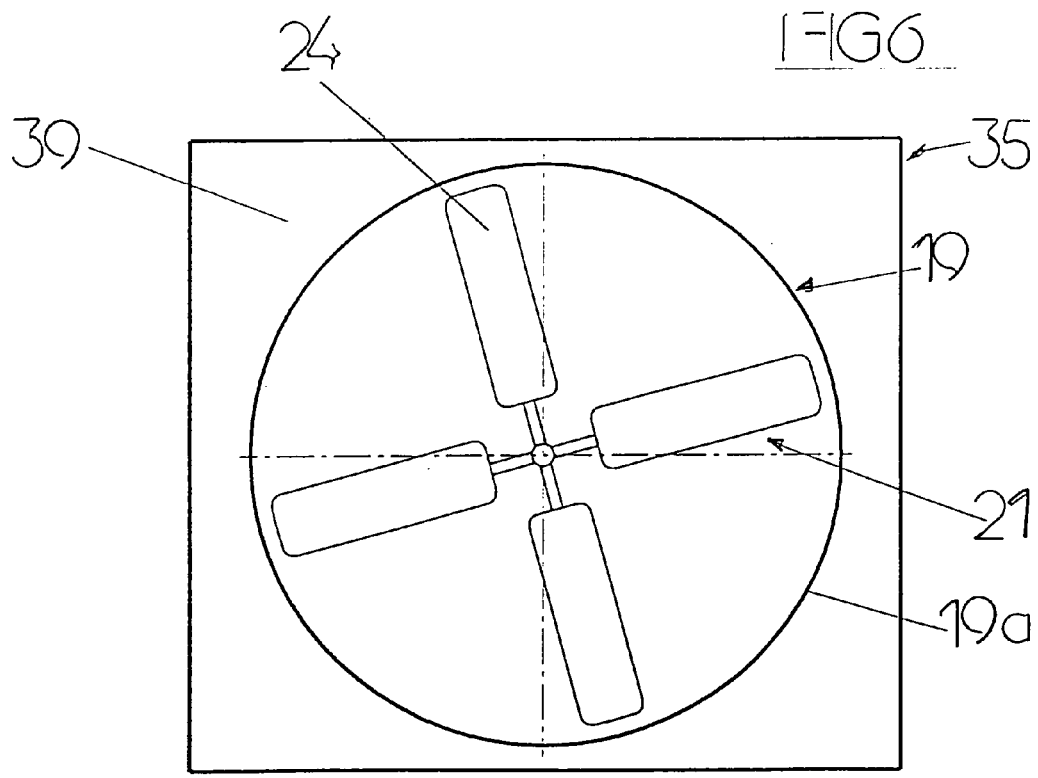
FIG. 6 shows an overhead view onto the frying fat heating device in accordance with FIG. 4 along the intersection line B—B in FIG. 4.
Figure 7:
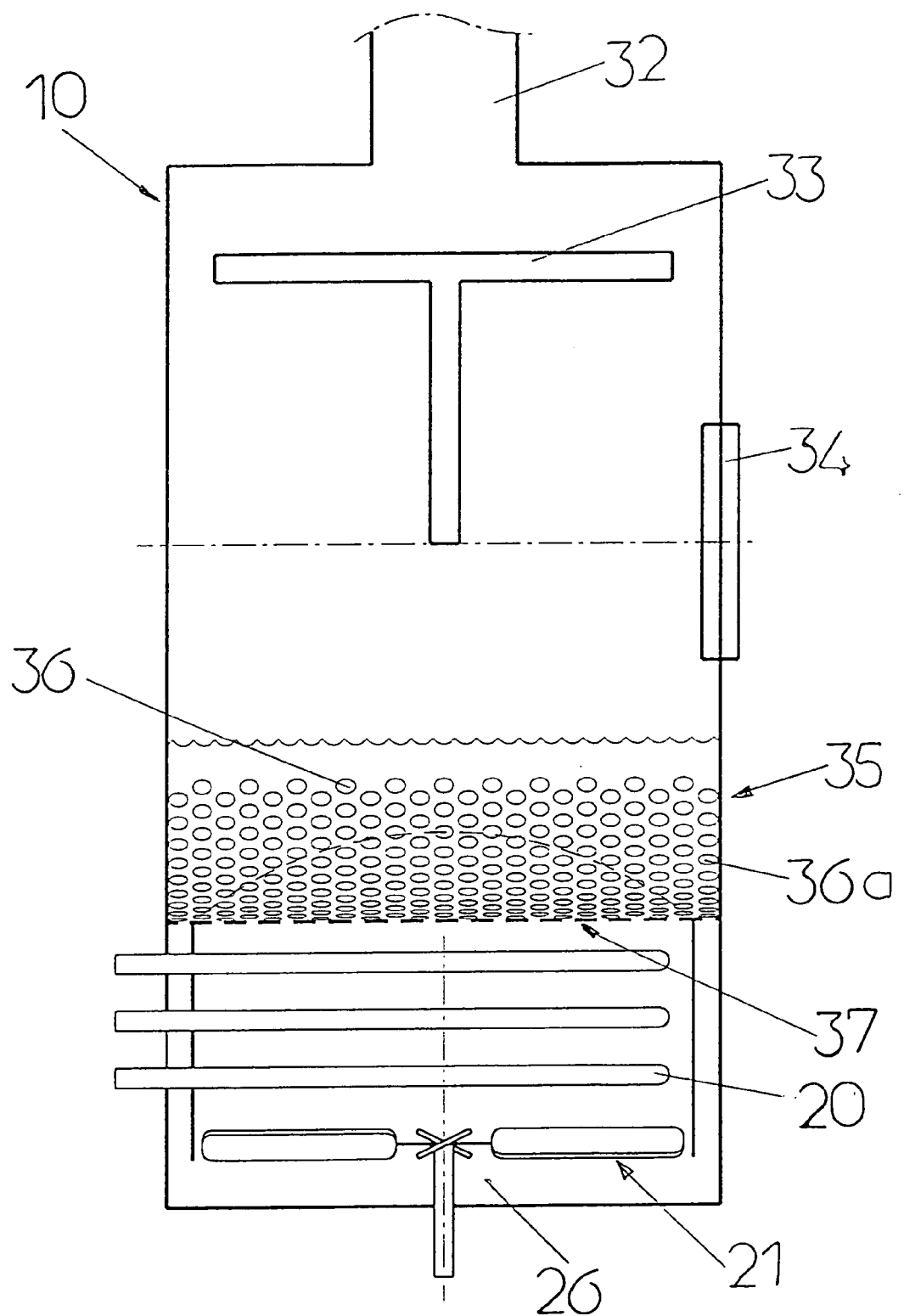
FIG. 7 shows the frying fat heating device with the cooking vessel in accordance with FIG. 4 in a side view.

The heating device 11 is located between the floor 17 of the pot 12 and the floor 18 of the receptacle 13, ie. the basket. The heating device 11 comprises a circular current conduction sleeve 19 (in the following referred to as conduction sleeve 19 for short) spaced apart from the floor 17 of the pot 12 in which a heating element 20 and a conveyance device 21 following the heating element 20, ie. between the heating element 20 and the floor, spaced apart from the heating element 20, are accommodated. The heating element 20 is an electrically powered heating rod which is bent in a serpentine shape and the cross-section of which is in the form of a circular disc, ie. round. The outer diameter of the heating element 20 is of proportions which mean that the heating element 20 can be introduced into the interior space of the conduction sleeve 19. The individual bent sections 22 of the heating element 20 are spaced apart from one another so that frying fat can pass through the heating element 20 taking in heat. The conveyance device 21 is in the form of an externally driven propeller, preferably with four blades 24, and which, like the heating element 20, is located in the interior space of the conduction sleeve 19, such that it can rotate. Preferably, the propeller blades 24 can have an adjustable angle (not shown) set to the rotational axis 23 of the conveyance device 21, which moves in the range of one to ten angle degrees, preferably four to eight angle degrees. The heating element 20 is moved from the upper edge (edge below the floor 18 of the receptacle 13 or on the up-current side) of the conduction sleeve 19, axially in the direction towards the lower edge (edge above the floor 17 of the pot 12, or on the down-current side) of the conduction sleeve 19, so that a circular space 25 is formed above the heating element 20, the propeller, ie. the conveyance device 21 coincides axially with the lower edge of the conduction sleeve 19. Because the outer diameter of the conduction sleeve 19 is smaller than the internal diameter of the pot 12 and the lower edge of the conduction sleeve 12 is spaced apart from the floor 17 of the pot, a current space 31 is created below and around the conduction sleeve, formed from a flat cylindrical floor space 26 and a riser pipe 27 for the removal of heated frying fat, which has travelled through the conduction sleeve 19 with the heating element 20 and the conveyance device 21. The circular space 25 has proven advantageous for the evenness of heating of the frying fat. In connection with FIGS. 1 to 3, the pot 12, receptacle 13 and conduction sleeve 19 were described as cylindrical in form. However, the frying fat heating device 11 is not limited to this form. For example (see FIGS. 5 and 6) an appendage 35 for the current conduction sleeve 19 can be multi-sided, and the current conduction sleeve 19 can be round. The mode of operation for the frying fat heating device 11 in accordance with the invention is as follows. Cooled frying fat 15 is conveyed from the frying fat supply (see level line 28) through the conduction sleeve 19 by gravitation and falling, supported by the effect of the activated conveyance device 21 (drive not shown). In so doing, the frying fat 15 is heated as it flows through the heating element 20 and moved on by the conveyance device 21 in the direction of the floor space 26, from where the frying fat 15 climbs, passing through the riser pipe 27, due to its greater heat content and driven by the conveyance device 21 in the direction of the frying fat supply, and mixes with the cooler supply of frying fat. This is shown schematically by the current arrows 30. With the embodiment of the frying fat heating device in accordance with the invention, very homogeneous heat distribution is achieved in the frying fat 15, and any mechanical forces are avoided.

Figure 2:
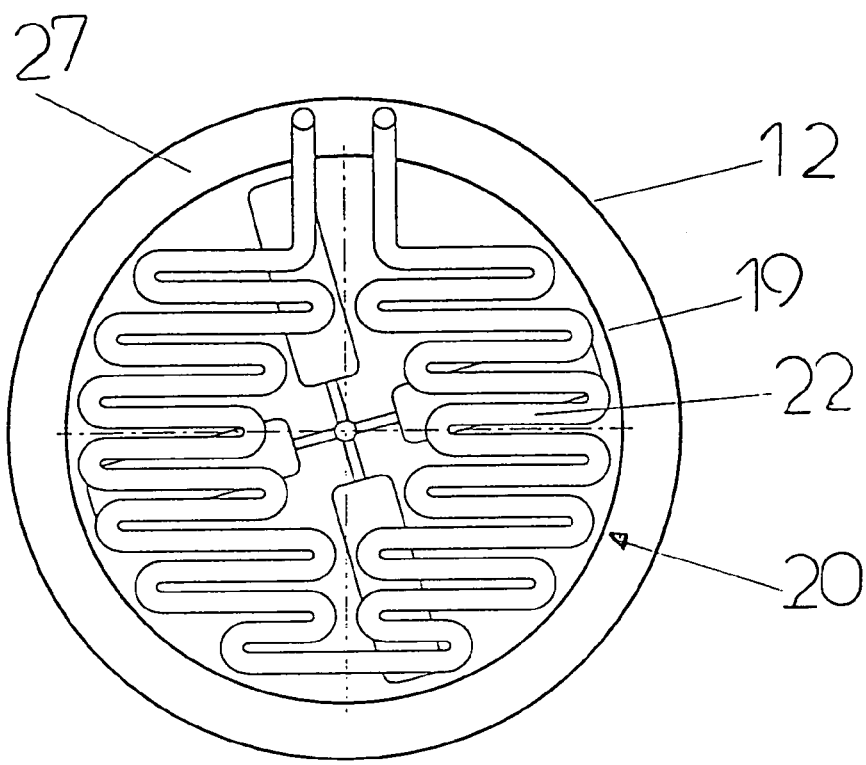
FIG. 2 shows the representation in accordance with FIG. 1 in an overhead view.
Figure 3:
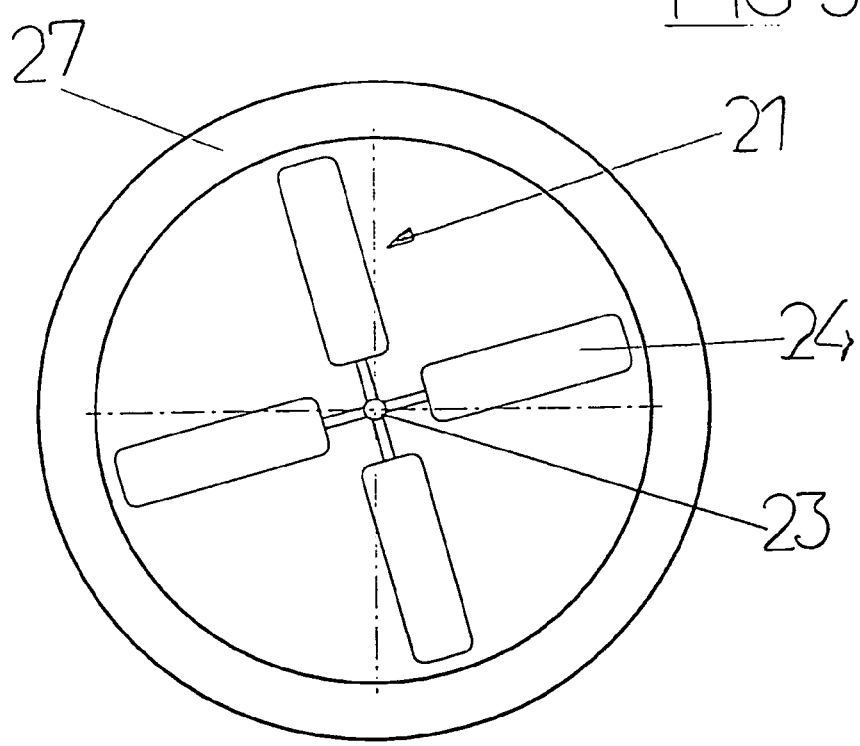
FIG. 3 shows the representation in accordance with FIG. 1 in an overhead view along the intersection line A—A in FIG. 1.

While the embodiment in accordance with FIGS. 1 to 3 is designed more for manual operation, whereby items to be cooked are introduced into and removed from the frying fat 15 using the receptacle 13, ie. the basket, the embodiment in accordance with FIGS. 1 to 7 schematically shows a fully automatic cooking appliance. The cooking vessel 10 here is drum-shaped, and in the form of a hollow cylinder lying on its side, in which the frying fat 15 is received, and into which the items to be cooked are fed in through an entrance 32, moved by means of a rotating turning element 33 for cooking with the frying fat 15, and carried out via an exit device 34 once cooking is completed. If one identifies the circumference of the cooking vessel 10 with the entrance 32 as the upper side of the cooking vessel 10, the frying fat heating device 11 in accordance with the invention is positioned perpendicularly in relation to the upper side on the lower side of the cooking vessel 10. The frying fat heating device 11 in accordance with FIGS. 4 to 7 consists of a box-shaped appendage 35, the cross-section of which is rectangular and preferably has the same length as the hollow cylinder of the cooking vessel 10. The appendage 35 is positioned on the outer wall of the circumference of the hollow cylinder, and the wall section, which is covered by the appendage 35 has access openings 36 through which the frying fat 15 can be conveyed from the cooking vessel 10 into the conduction sleeve 19 in a downwards direction, heated up there, and once heated, it can be conveyed back in an upwards direction to the frying fat 15 in the cooking vessel 10, so as to then re-enter into the conduction sleeve 19, having cooled down. Below the wall section of the cooking vessel 10 which is provided with access openings 36, in the following referred to as the filter wall 37, are located the appendage 35, the longitudinal section of which is rectangular and the round current conduction sleeve 19, both in contact with the filter wall 37. With its circumference wall 10a and the perpendicular walls of the appendage 35, the round current conduction sleeve 19 forms a conveyance channel 39, which at one end (on the down-current side) is filled from the floor space 26 with heated frying fat 15, and which at the other end (on the up-current side) it conveys it to the frying fat held in the cooking vessel 10 through access openings 36a. During normal operation of the heating device 11, the access openings 36a serve predominantly only for the conveyance of heated frying fat 15 into the frying fat 15 in the cooking vessel 10, ie. into the drum 10, whereas the cold or cooled down frying fat 15 enters through the access openings 36 into the inner space of the conduction sleeve 19. In the inner space of the conduction sleeve 19 there are several heating elements 20 located on the down-current side of the filter wall 37 and formed as described in connection with the embodiment in accordance with FIGS. 1 to 3, below which, ie. seen in the direction of the current, the conveyance device 21 is located. The conveyance device in the current channel is positioned, formed and powered in the same way as described in FIGS. 1 to 3.

The conveyance channel 39 is essentially split in two by the conduction sleeve 19, whereby the parts 39a, 39b in the cross-section are essentially rectangular with a concave wall surface. It has been shown that a conveyance channel with this cross-section just as effectively allows heated frying fat 15 to rise as the riser pipe 27 in accordance with FIG. 1. The embodiments in accordance with FIGS. 1 and 4 are also provided with devices for keeping the frying fat temperatures constant (not shown), which measure the latter, and correspondingly apply electric energy to the heating elements. These devices can also be designed so that if the deep frying appliance is set to 'wait', the temperature of the frying fat 15 can be lowered and raised when being loaded.

The invention claimed is:

1. Cooking vessel comprises a frying fat heating device for the 'floating' frying of food portions and luxury foodstuffs, wherein the frying fat heating device (11) has a hollow cylindrical conduction sleeve (19) with heating elements (20) accommodated within the conduction sleeve (19) and a current space (31) connected with the conduction sleeve (19) via a floor space (26).

2. Cooking vessel in accordance with claim 1, wherein the conduction sleeve (19) has a circular space (25) on an up-current side.

3. Cooking vessel in accordance with claim 2, wherein a conveyance device is located in the conduction sleeve (19) on a down-current side of the heating elements (20).

4. Cooking vessel in accordance with claim 3, wherein the conveyance device (21) is in the form of a powered propeller.

5. Cooking vessel in accordance with claim 4, wherein the propeller has adjustable propeller blades (24) which can be adjusted to a rotational axis (23) of the conveyance device (21) at set angles.

6. Cooking vessel in accordance with claim 1, wherein the heating elements (20) comprise electrically powered, serpentine-shaped heating rods moulded into bent sections (22).

7. Cooking vessel in accordance with claim 1, wherein the heating elements (20) comprise circular discs.

8. Cooking vessel in accordance with claim 6, wherein the bent sections (22) are spaced apart from one another.

9. Cooking vessel in accordance with claim 1, wherein the conduction sleeve (19) is accommodated in the current space (31).

10. Cooking vessel in accordance with claim 9, wherein the current space (31) comprises a riser pipe (27).

11. Cooking vessel in accordance with claim 9, wherein the current space (31) comprises a box-like appendage (35) located on a circumference wall of the cooking vessel (10), and a part of the circumference wall covered by the appendage (35) forms a filter wall (37) with first access openings (36) for introducing cooled frying fat (15) into the conduction sleeve (19) and second access openings (36a) for introducing heated frying fat (15) into the cooking vessel (10).

* * * * *